United States Patent
Cara et al.

(10) Patent No.: US 10,060,651 B2
(45) Date of Patent: Aug. 28, 2018

(54) HEAT FLOW SENSOR

(71) Applicant: Cockerill Maintenance & Ingenierie S.A., Seraing (BE)

(72) Inventors: Fabien Cara, Doubs (FR); Daniel Rudaz, La Tour-de-Peilz (CH); Alfred Dethier, Sprimont (BE)

(73) Assignee: Cockerill Maintenance & Ingenierie S.A., Seraing (BE)

( * ) Notice: Subject to any disclaimer, the term of this patent is extended or adjusted under 35 U.S.C. 154(b) by 256 days.

(21) Appl. No.: 14/892,537

(22) PCT Filed: Apr. 1, 2014

(86) PCT No.: PCT/EP2014/056525
§ 371 (c)(1),
(2) Date: Nov. 19, 2015

(87) PCT Pub. No.: WO2014/187598
PCT Pub. Date: Nov. 27, 2014

(65) Prior Publication Data
US 2016/0084531 A1    Mar. 24, 2016

(30) Foreign Application Priority Data
May 23, 2013 (BE) .................................. 2013/0363

(51) Int. Cl.
*F24J 2/40* (2006.01)
*F24J 2/46* (2006.01)
(Continued)

(52) U.S. Cl.
CPC ................. *F24J 2/402* (2013.01); *F24J 2/07* (2013.01); *F24J 2/4621* (2013.01); *G01K 1/143* (2013.01);
(Continued)

(58) Field of Classification Search
CPC .......... G01K 17/20; G01K 1/143; F22B 37/38
See application file for complete search history.

(56) References Cited

U.S. PATENT DOCUMENTS

| 3,724,267 A | * | 4/1973 | Zoschak | ................ G01K 17/00 |
| | | | | 165/11.1 |
| 4,527,908 A | * | 7/1985 | Arisi | ........................ G01K 1/14 |
| | | | | 122/448.1 |

(Continued)

FOREIGN PATENT DOCUMENTS

| JP | 2006329640 A | 12/2006 |
| WO | WO 2010/094618 A1 | 8/2010 |
| WO | WO 2010/100335 A1 | 9/2010 |
| WO | WO 2014/187598 A1 | 11/2014 |

*Primary Examiner* — Avinash Savani
*Assistant Examiner* — Deepak Deean
(74) *Attorney, Agent, or Firm* — Reinhart Boerner Van Deuren P.C.

(57) ABSTRACT

The present invention relates to a heat exchanger comprising a plurality of exchange tubes (1) mounted joined longitudinally in such a way as to create a front surface portion (4) creating an obstacle to an incident heat flow and at least one heat flow sensor (5) disposed in a support (12) located between two adjacent exchange tubes (1), characterized in that the support (12) of the heat flow sensor (5) is brazed to at least one of the two tubes (1) and is flattened on the side that is to be disposed at the front (4), with reference to the incident heat flow, in such a way as to be able to be inserted between the two adjacent tubes (1) at the location of said local deformations (11).

8 Claims, 4 Drawing Sheets

(51) Int. Cl.
  *G01K 1/14*   (2006.01)
  *G01K 17/20*  (2006.01)
  *F24J 2/07*   (2006.01)
  *F28F 27/00*  (2006.01)
  *F28D 7/00*   (2006.01)

(52) U.S. Cl.
  CPC ............ *G01K 17/20* (2013.01); *F28D 7/0041* (2013.01); *F28F 27/00* (2013.01); *F28F 2265/10* (2013.01); *Y02E 10/41* (2013.01)

(56) References Cited

U.S. PATENT DOCUMENTS

| | | | | |
|---|---|---|---|---|
| 6,485,174 | B1* | 11/2002 | Albrecht | G01K 17/08 374/147 |
| 6,848,373 | B2* | 2/2005 | Breen | F28D 7/0041 110/185 |
| 7,249,885 | B2* | 7/2007 | Van Den Ende | F28F 27/00 374/147 |
| 8,591,102 | B2* | 11/2013 | Frach | F22B 37/38 374/112 |
| 8,869,530 | B2* | 10/2014 | Dethier | F22B 1/006 126/651 |
| 2011/0283820 | A1* | 11/2011 | Glaser | G01D 11/30 73/865.8 |
| 2011/0289921 | A1* | 12/2011 | Dethier | F22B 1/006 60/641.8 |
| 2012/0067542 | A1 | 3/2012 | Frach et al. | |

* cited by examiner

HEAT FLOW SENSOR

SUBJECT-MATTER OF THE INVENTION

The present invention relates to a heat flow sensor designed to be installed in a surface portion of a heat exchanger, the heat flow being able to be conductive, convective or radiative. The heat flow sensor generates an electric signal proportional to the temperature gradient generated by the heat flow in the sensor. The heat flow is then obtained by dividing the obtained signal by a constant specific to each sensor (calibration).

STATE OF THE ART

In solar power unit 100 applications with thermodynamic concentrations 102 comprising solar boilers 103 such as that shown in FIG. 6, it is know that solar radiation is concentrated by mirrors oriented depending on the position of the sun and tracking the movement thereof. The solar concentration can thus reach very high values, up to 1000 times, resulting in very high heat flows on the receiving panels of the solar boiler. These exchange panels are often made up of a set of tubes stacked longitudinally so as to create a wall that is "sealed" against the incident light flow.

For example, document WO 2010/094618 shows a so-called "flag" exchanger, where adjacent hairpin-shaped tubes are positioned side by side and fixed, cantilevered, on the same side to the input and output collectors.

The mechanical holding of the component elements of these receiving panels requires limiting the value of the aforementioned flows, in a way that is compatible with the materials used in the panels and with the heat exchange properties thereof.

It is therefore useful to be able to measure the heat flows during the operation of the solar boiler. Heat flow sensors are thus used to that end.

Nowadays, two technologies are used for these flow sensors:
  the first technology is the so-called through tube technology (as shown in FIG. 1). The receiving panels being made up of tubes 1 installed side by side and forming a wall that is sealed against the solar radiation, an additional tube 2 with a small diameter crosses through the panel tube 1 along its section and is welded thereto in order to keep a sealed assembly resisting the steam pressure from the boiler. The front face 4 of the tube(s) 1 is that exposed to the heat flow, while the rear face 3 is that opposite the front face 4. The flow sensor is inserted via the rear face 3 in the through tube 2, until it reaches the face 4 exposed to the radiation. As shown in FIG. 2, the heat flow is measured by the temperature differential between the apex 6 of the sensor 5 and the body 7 thereof, said body being cooled by the fluid flowing in the exchange tube 1, via the contact with the through tube 2;
  the second technology is a technology using thermocouples embedded in a cladding, as shown in FIG. 3. Two thermocouples (not shown) are installed on the face of the tube 1 exposed to the radiation, in a local deformation 8 of the tube. This deformation is done cold without thinning. The thermocouples and their connecting cables are next covered with a weld deposit overlay 9, thus reconstituting the initial surface of the tube 1.

In the first case, the through tube 2 causes high local stresses 10, as shown in FIG. 4, which can cause deterioration of the tube and a risk of leakage over time.

In the second case, a tube segment must be worked in the workshop and requires two tube-tube welds on the panel to each sensor.

U.S. Pat. No. 3,724,267 discloses a heat flow detecting device comprising a sensor situated between two tubes longitudinally connected by a fin. The sensor is provided with two thermocouples. The base of the sensor comprises parts that extend in lateral portions of the tubes. The base of the sensor is in thermal contact with the fin.

U.S. Pat. No. 6,485,174 discloses a heat flow detection device comprising a sensor situated between two tubes connected longitudinally by a membrane. The sensor is provided with two thermocouples. The sensor is inserted from the rear in the membrane. The measurement of the heat flow is determined by the two thermocouples separated by a certain distance in the sensor. The information given by the measurements of the thermocouples makes it possible to calculate the heat flow.

Document US 2012/0067542 discloses a measuring device for a heat exchanger comprising a series of tubes connected by membranes that has a heating side and an insulating side. A heat flow sensor comprising two temperature sensors is positioned in a recess of the tube on the heating side. The two sensors measure temperatures T1 and T2, the difference of which can be detected. A temperature sensor for measuring a temperature T3 is positioned on the insulating side and at a certain distance from the heat flow sensor.

Document JP 2006-329640 discloses a flow meter of the heat type equipped with a sensor support comprising the temperature sensors each placed in a cylindrical sheath supported by an intermediate section followed by a temperature-sensitive sensor section. These last two sections are placed in the flow of fluid flowing in tubes.

Document WO 2010/100335 discloses an arrangement making it possible to mount a sensor in a wall of a heat exchanger, which is formed by steel tubes welded to one another, fin plates between the tubes forming a membrane wall. The chamber of the sensor and the conductive channel necessary for the wires of the sensor are situated on the side of the boiler in a thicker portion of the wall of the steel tube.

AIMS OF THE INVENTION

The present invention aims to provide a heat flow sensor that makes it possible to do away with the drawbacks of the state of the art, i.e., in particular those relative to the technology of the through tube or of thermocouples embedded in a local deformation of the exchange tube, with a weld cladding.

In particular, the invention aims to provide a non-invasive heat flow sensor, not requiring machining of the tubes, or deformation of the tubes with pressurized weld production.

The invention also aims to provide a heat flow sensor support that is cost-effective and allows easy replacement of the sensor.

MAIN FEATURES OF THE INVENTION

A first object of the present invention relates to a heat exchanger comprising a plurality of exchange tubes mounted joined longitudinally in such a way as to create a front surface portion creating an obstacle to an incident heat flow and at least one heat flow sensor disposed in a support located between two adjacent exchange tubes, wherein:

the two adjacent tubes each have, at their joined portion, a slight local deformation, so as to allow the positioning of the heat flow sensor support by insertion between the two tubes;

the heat flow sensor is mounted movably in said support, the latter having the shape of a hollow enclosure made so as to be able to be inserted between the two adjacent tubes, at the location of said local deformations;

and characterized in that the support of the heat flow sensor is brazed to at least one of the two tubes and is flattened on the side that is to be positioned at the front, with reference to the incident heat flow, in such a way as to be able to be inserted between the two adjacent tubes at the location of said local deformations.

According to preferred embodiments of the invention, the heat exchanger further comprises one of the following features or a suitable combination of the following features:

the heat flow sensor comprises a removable conical part that is inserted from the rear, with reference to the incident heat flow, and is screwed into said support toward the front, thus ensuring thermal contact between the sensor and the support;

the heat flow sensor comprises a front tip and a body where the temperature measurements will be respectively done, making it possible to obtain a temperature difference for the measurement of the heat flow;

the slight local deformation is a deformation done by press.

A second object of the present invention relates to a solar power unit with thermodynamic concentration comprising a boiler provided with a heat exchanger as described above.

DESCRIPTION OF ONE PREFERRED EMBODIMENT OF THE INVENTION

The idea at the base of the present invention consists in installing the heat flow sensor between two tubes of the exchange panel, without seal break, without producing presurized welds and with as little machining or deformation of the tubes as possible. The invention is in particular directed to a heat exchanger application where the exchange tubes are joined, optionally with slight play, with no junction fin between the tubes.

Figure 1:
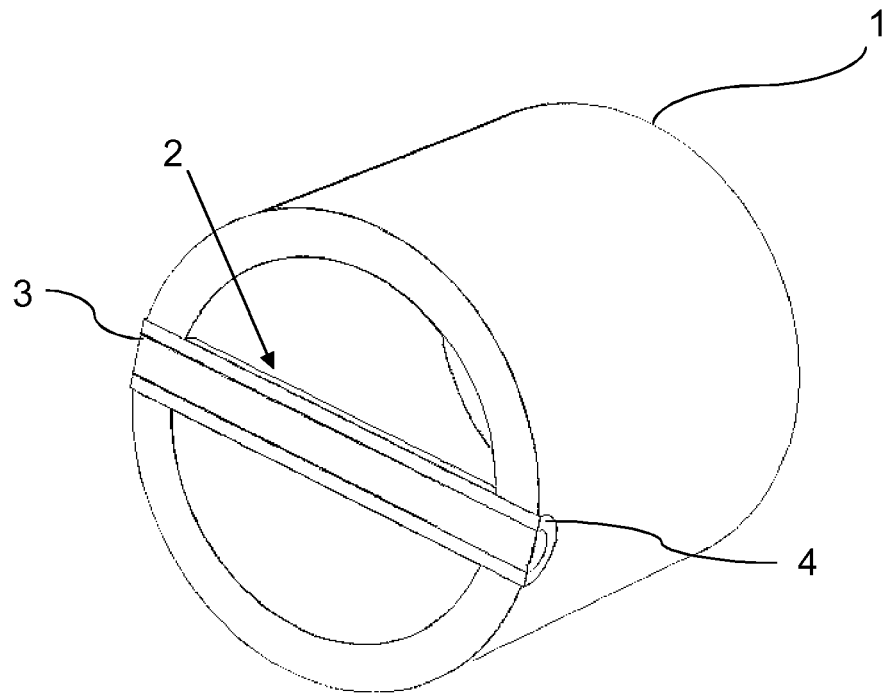
FIG. 1 is a perspective view of an exchange panel tube equipped with a through tube designed for the installation of a heat flow sensor, according to the state of the art.
Figure 4:
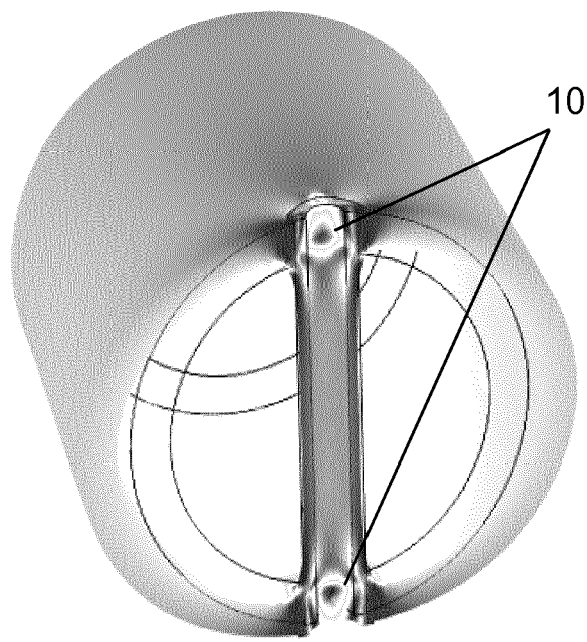
FIG. 4 shows the local stresses resulting from the use of the through tube technology of FIG. 1.
Figure 2:
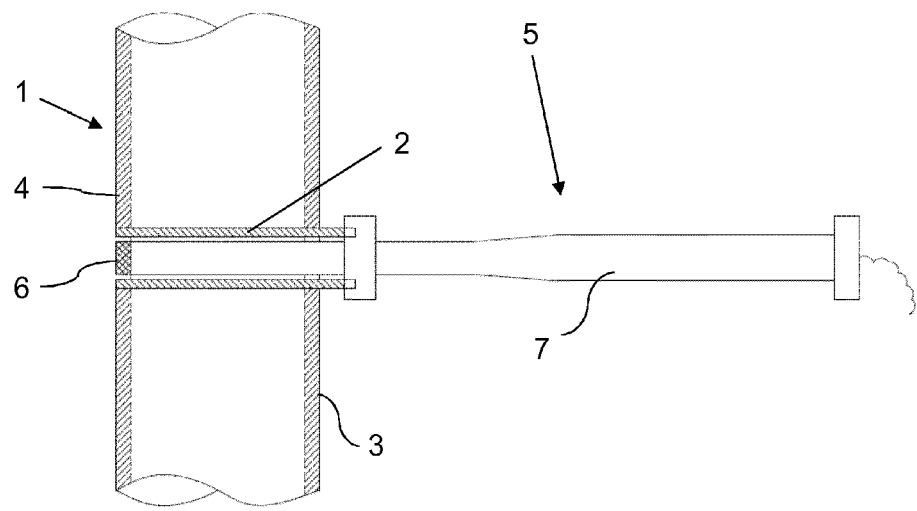
FIG. 2 is a sectional view of a heat flow sensor installed according to the through tube technology of FIG. 1.
Figure 3:
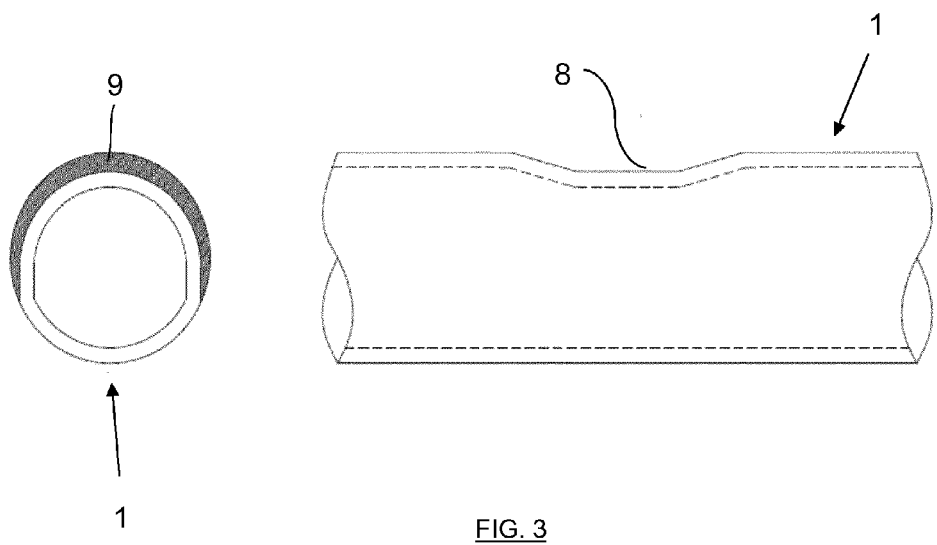
FIG. 3 diagrammatically shows the technology for installing thermocouples in a local deformation of an exchange tube with weld deposit overlay, according to the state of the art.
Figure 5A:
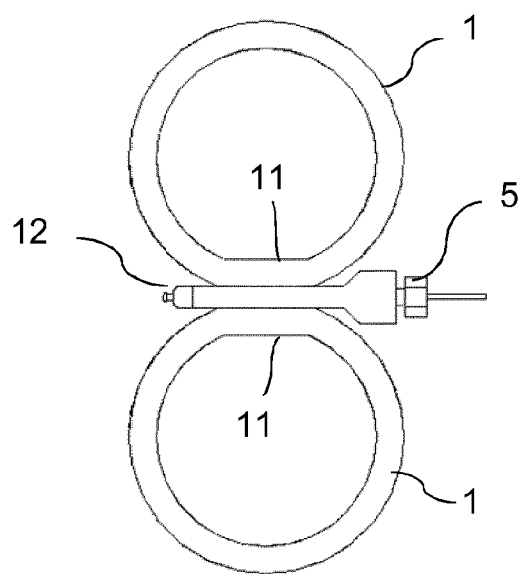
FIGS. 5A and 5B respectively show a cross-sectional view and perspective view of a heat flow sensor in position in its support on the exchange tubes according to one particular embodiment of the present invention.
Figure 5B:
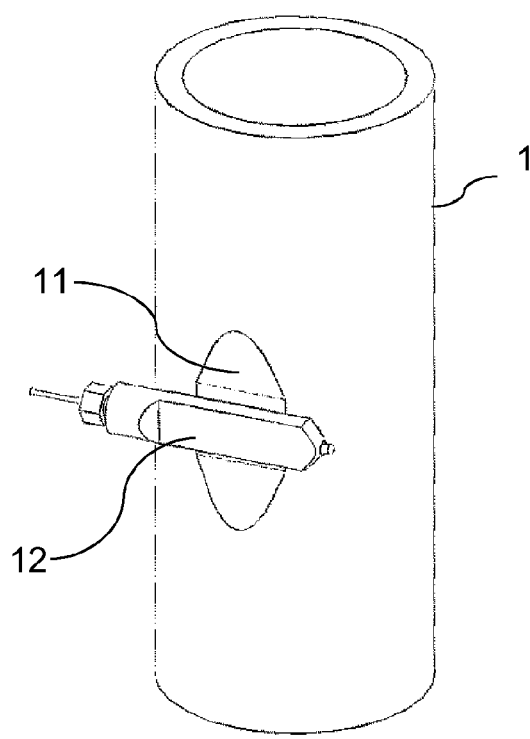
Figure 6:
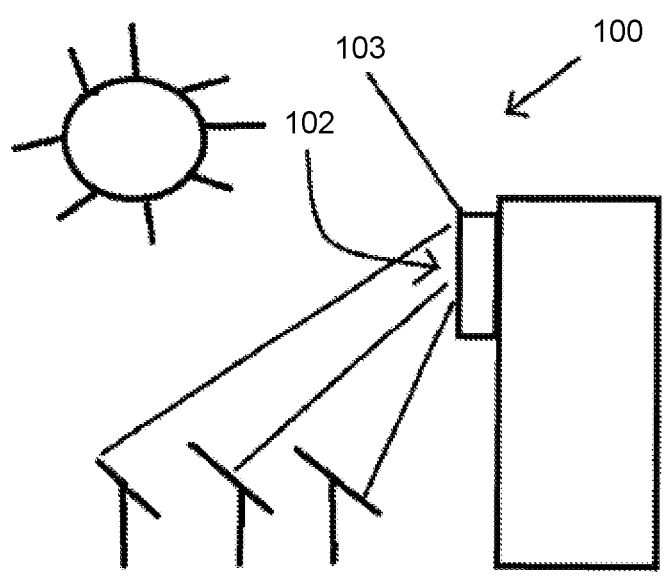
FIG. 6 is a side schematic view of a solar power unit with thermodynamic concentration comprising a boiler.

To that end, as shown in FIGS. 5A and 5B for one example embodiment, a very slight local deformation 11 of the two tubes 1 will be done by press. A sensor support 12, essentially in the form of a tube flattened on one side, will then be installed between the two exchange tubes 1 and brazed to one of the exchange tubes 1 in order to ensure maintenance of the support, but also proper cooling thereof by the fluid flowing in the exchange tube. The sensor 5 will be inserted into the support 12 from the rear, relative to the incident solar flow, and screwed to the support 12. The sensor 5 advantageously comprises a conical part (not shown) adapting to the inside of the support 12, embodying the contact between the sensor 5 and the support 12 cooled by the tube 1 on which the latter is brazed.

As in the technologies of the state of the art, the heat flow will be the image of the temperature difference between the tip of the sensor and the body thereof, which is cooled by the fluid flowing in the tube.

The solution provided by the present invention is non-intrusive, does not cause any risk for the tube and has the advantage of not requiring additional pressurized welding. Furthermore, as in the through tube solution, the sensor can be removed from the rear and can easily be replaced.

REFERENCE SYMBOLS 1. exchange tube
2. through tube, heat flow sensor support
3. rear part of the exchange tube
4. front part of the exchange tube
5. heat flow sensor
6. sensor tip
7. sensor body
8. local tube deformation
9. weld cladding containing the thermocouples
10. local stress
11. deformation/flat in the exchange tube
12. sensor support

The invention claimed is:

1. A heat exchanger comprising at least two exchange tubes (1) contiguously mounted longitudinally so as to create a front surface portion (4) forming, in use, an obstacle to an incident heat flow and at least one heat flow sensor (5) disposed in a support (12) located between the two adjacent exchange tubes (1), wherein:

the two adjacent tubes (1) each have, at their contiguous portion, a slight local deformation (11), in such a way as to allow the positioning of the heat flow sensor (5) support (12) by insertion between the two tubes;

the heat flow sensor (5) inserted through an opening of the support opposite the front surface portion and is mounted movably in said support (12), said support having the shape of a hollow enclosure made in such a way as to be able to be inserted between the two adjacent tubes (1), at the location of said local deformations (11);

and characterized in that the support (12) of the heat flow sensor (5) is brazed to at least one of the two tubes (1) and is thinned longitudinally on the side that is to be disposed at the front surface portion (4), said front surface portion being defined with reference to the incident heat flow existing in use, so as to be able to be inserted between the two adjacent tubes (1) at the location of said local deformations (11).

2. The heat exchanger according to claim 1, characterized in that the heat flow sensor (5) comprises a removable part that is inserted from a rear surface portion (3), said rear surface portion being defined with reference to the incident heat flow existing in use, and is screwed into said support

(12) toward the front surface portion (4), thus ensuring thermal contact between the sensor (5) and the support (12).

3. The heat exchanger according to claim 2, characterized in that the heat flow sensor (5) comprises a front tip (6) and a body (7) where the temperature measurements will be respectively done making it possible to obtain, in use, a temperature difference for the measurement of the heat flow.

4. The heat exchanger according to claim 1, characterized in that the slight local deformation (11) is a deformation done by press.

5. A solar power unit with thermodynamic concentration comprising a boiler provided with a heat exchanger according to claim 1.

6. A solar power unit with thermodynamic concentration comprising a boiler provided with a heat exchanger according to claim 2.

7. A solar power unit with thermodynamic concentration comprising a boiler provided with a heat exchanger according to claim 3.

8. A solar power unit with thermodynamic concentration comprising a boiler provided with a heat exchanger according to claim 4.

* * * * *